Dec. 18, 1923.
A. E. OSBORN
1,477,891
AUTOMATICALLY ADJUSTING TURNBUCKLE
Filed Nov. 20, 1920    2 Sheets-Sheet 2
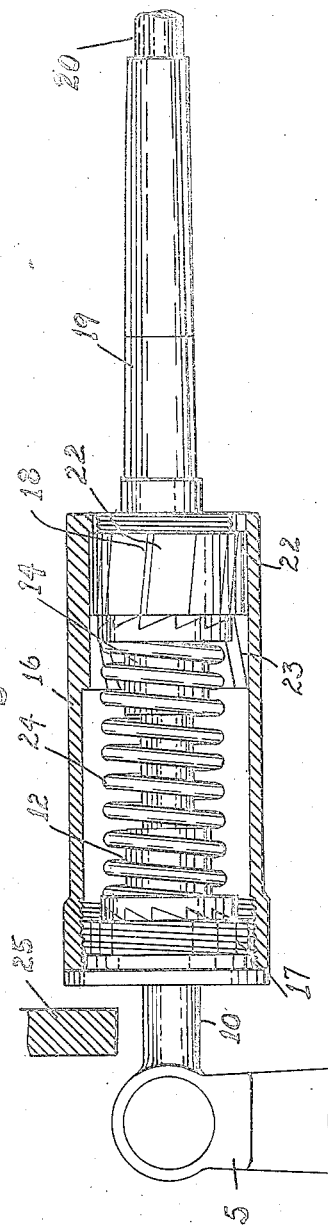
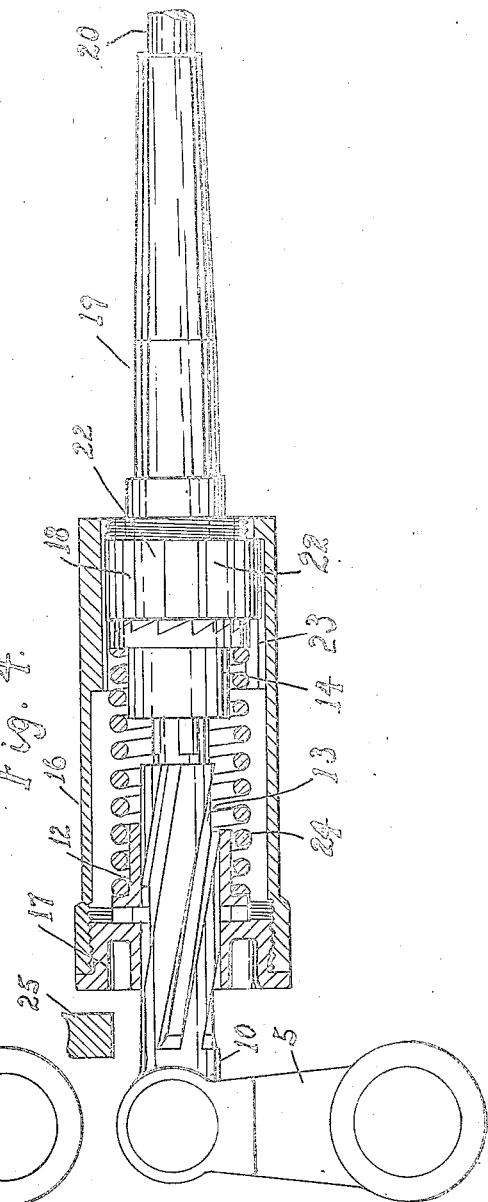
INVENTOR
Alden E. Osborn.

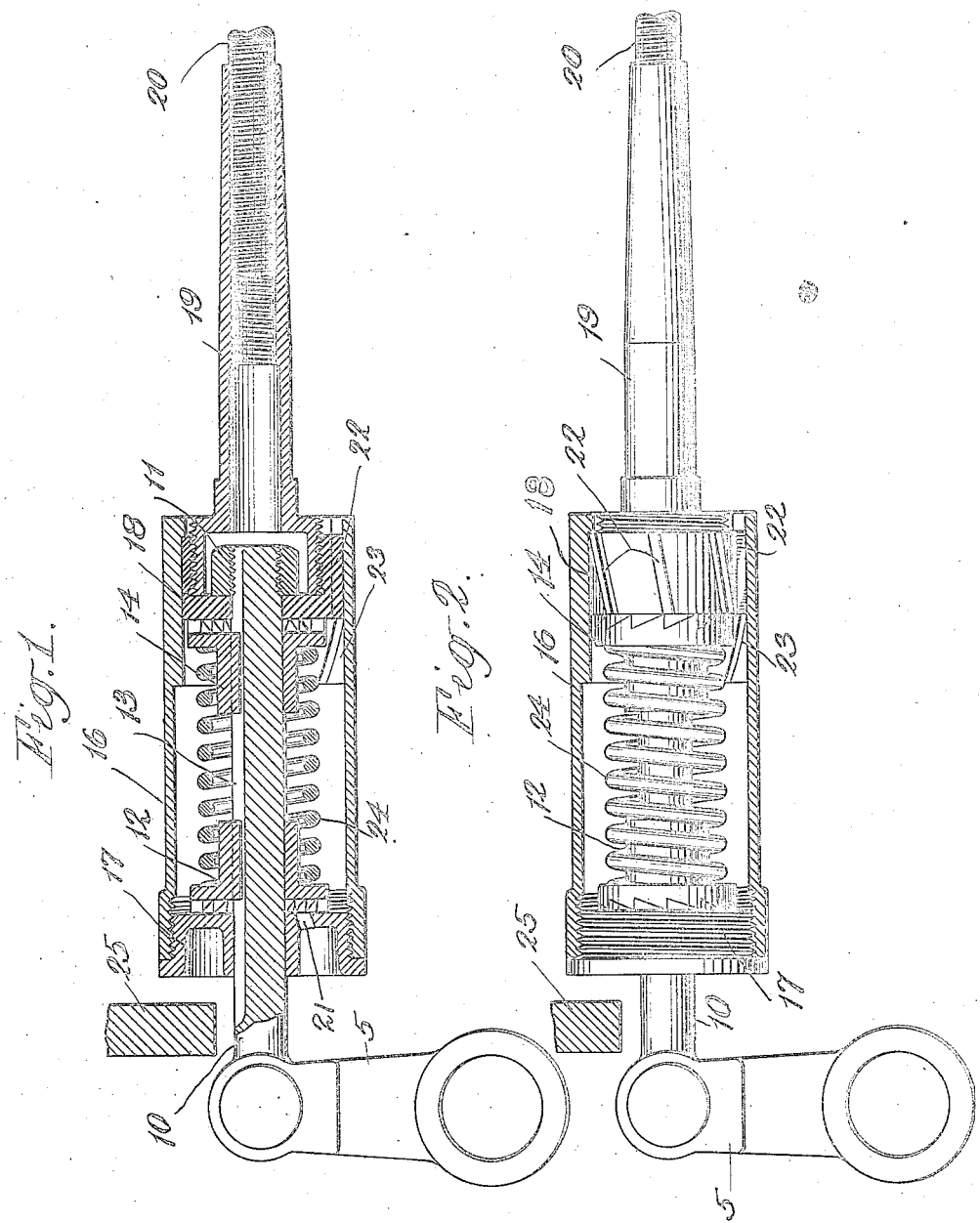

Patented Dec. 18, 1923.

1,477,891

UNITED STATES PATENT OFFICE.

ALDEN E. OSBORN, OF NEW YORK, N. Y.

AUTOMATICALLY-ADJUSTING TURNBUCKLE.

Application filed November 20, 1920. Serial No. 425,588.

*To all whom it may concern:*

Be it known that I, ALDEN E. OSBORN, a citizen of the United States of America, and a resident of New York, county of the Bronx, and State of New York, have invented certain new and useful Improvements in an Automatically-Adjusting Turnbuckle, of which the following is a specification.

The object of this invention is to provide a device to automatically adjust operating rods or cables so that the parts connected to one side of said device have a substantially constant longitudinal movement irrespective of the fact that the parts connected with the other side thereof may vary their position in reference to the first parts due to wear or other causes. It is particularly adapted to automatically adjust the rods or cables operating the brakes of motor vehicles in order that when wear of the brakes allow more than a certain movement of the actuating pedal the adjustment would automatically occur. It would also act when two or more devices that wear or change their relation are to be worked from a single actuating part to automatically allow for and take up such wear even though it is different in each of such devices. Thus, when used with the two rear wheel brakes of a motor vehicle, which are actuated as usual from a single pedal or lever thru equalizers, one of these automatic adjusters would be used on each brake connection so as to take up on the brake it works independently. A special feature of my device is in the fact that it is practically entirely carried by the rod or member that is to be automatically adjusted as the stop or other member against which it strikes, when the point at which the adjusting takes place is reached, is the only part not carried by the rod having anything to do with my mechanism. For the sake of clearness I have described and illustrated my device in a form such as would be applied to the automatic adjustment of motor vehicle brakes alone but I would have it understood that it is susceptible of embodiment in other forms without departure from the true spirit and scope of the invention as defined in the appended claims. In these drawings:

Figure 1 represents a longitudinal sectional view of my invention.

Figure 2 represents a longitudinal partial sectional view of Figure 1.

Figure 3 represents a longitudinal partial sectional view of a modification of Figures 1 and 2 and, Figure 4 represents a longitudinal partial sectional view of a still further modification.

In the figures 10 indicates the rod or member to which the motion or pull is first communicated and which is intended to have a certain limited longitudinal motion and 20 indicates the rod or member to which the motion is to be communicated and which is to be adjusted by my device nearer to the rod 10 as the parts connected to it wear or otherwise allow of a movement beyond the desired limit. The member 10 is provided with a nut 11 at its inner end and carries two longitudinally slidable ratchet discs 12 and 14 which are kept from turning on the member by being provided with tongues fitting in a keyway 13 in the member or by having square holes fitting a suitable square part on the member or by any other suitable means. The teeth on the ratchet disc 12 mesh with suitable ratchet teeth on the cover 17 of the barrel 16 while the teeth on the ratchet disc 14 mesh with suitable ratchet teeth on the collar 18 which bears against the nut 11 and is attached to the sleeve 19 which is threaded on the member 20. The collar 18 is provided on its exterior with one or more projecting ridges 22 which fit suitable spiral grooves 23 in the interior of the barrel 16 so that a longitudinal movement of the barrel would cause the collar and parts attached thereto to rotate. In order to actuate the rod or member 10 a lever 5 is shown as pivotally attached thereto and in order to determine the point in the movement of the parts where the automatic adjusting action shall take place a suitable stop 25 is provided which stop may be a special fitting or may be a part of the apparatus on which the device is used. When the device is not in contact with this stop 25 the parts are maintained in their normal position by a spring 24.

The operation of the device shown in Figures 1 and 2 is as follows:—When the parts are properly adjusted and are operated under ordinary conditions the device simply moves with the rods or members 10 and 20 without any action taking place. If however, due to wear on the mechanism actuated by the member 20 or other causes, the member 20 is allowed to move beyond its normal range the cover 17 comes into contact with the stop 25 thus holding the barrel 16 stationary and pushing it longitudinally along in relation to the members 10 and 20 if they continue to move. The effect of this is, as the barrel 16 is prevented from turning by the sliding ratchet disc 12, to turn the collar 18, thru the action of the spiral ridges or keys 22 and the spiral grooves 23, and the sleeve 19 and thus by means of the thread on this sleeve and on the rod or member 20 bringing that member a little nearer to the member 10. When the member 10 is moved so as to disengage the stop 25 the spring 24 returns the parts again to the position in which they are shown. While this is occurring the ratchet disc 14 prevents the collar 18 and sleeve 19 from turning backward while the ratchet 12 allows the barrel 16 to turn and assume a position where it will further rotate the sleeve 19 when the stop 25 is again engaged.

It will be seen from the above that it is possible to bring about the correct adjustment between the members 10 and 20 simply by reciprocating the member 10 a few times. Thus with motor vehicle brakes operated thru this device it would simply be necessary, in order to obtain the correct adjustment, to screw the sleeve 19 up with the fingers and then work the brake operating pedal or lever a few times. In order to release the parts, should it be desired to back off on the adjustment, it is only necessary to disengage the ratchet disc 12 from the cover 17. This can be done by thrusting a nail or rod against the disc thru a suitable hole 21 that may be drilled where desired in the parts or by thrusting a wire or rod along the keyway 13 (which can be cut longer for the purpose) and against the key on the disc. Owing to the direction of the ratchet teeth the adjustment can be tightened by simply turning the device without disengaging these teeth. While the various parts may be fastened together by any suitable means, I have shown them as fastened together by threaded joints and when such a method of attachment is used it is preferable that, in addition to other locking means that may be provided, the threads be all arranged so that they tighten up under the action of the mechanism. It will be noticed that, as just described, the automatic adjustment occurs when the parts are under tension and as under some conditions this would not be desirable, I have illustrated a modification in Fig. 3 in which the adjustment takes place after the stop 25 has been disengaged and under the action of the spring 24. This is accomplished by simply reversing the direction of the spiral keys 22 and grooves 23 so that the collar 18 and sleeve 19 would be turned in the proper direction to tighten the adjustment when the barrel 16 returns under the spring pressure. Another modification is shown in Fig. 4 in that the groove or keyway 13 (or squared section) is made spiral at the end carrying the ratchet disc 12 in order to give a rotary motion to that disc when it is slid along the member 10 so that the barrel 16 will be rotated. This rotation of the barrel 16 can then be transmitted to the collar 18 by straight keys instead of by the spiral keys as shown in the Figures 1, 2 and 3.

Having thus described my invention, I claim as new and desire to secure by Letters Patent—

1. The combination of a primary reciprocating member, a second reciprocating member operated thereform and adjustable in relation thereto, a rotatable element mounted on one of said reciprocating members and having a thread coacting with a threaded portion of the other said reciprocating member, a longitudinally slidable element, means, acting independently of said thread, whereby, when said slidable element is moved in relation to and parallel with the direction of motion of said primary reciprocating member, said rotatable element is turned to cause the said adjustment between the members thru the action of said threaded parts, a stop to cause the said movement of said longitudinally slidable element, and a spring to return said longitudinally slidable element to its normal position.

2. The combination of a primary reciprocating member, a second reciprocating member operated therefrom and adjustable in relation thereto, a rotatable element mounted on one of said reciprocating members and having a thread coacting with a threaded portion of the other said reciprocating member, a longitudinally slidable element movable in relation to and parallel with the direction of motion of said primary reciprocating member, a stop to cause the movement of said longitudinally slidable element, a spring to return said element to its normal position, and means whereby the longitudinal movement of said element rotates said rotatable element independently of said thread to cause said adjustment between the said primary and second reciprocating members thru the action of said threaded parts.

3. The combination of a reciprocating member, a rotatable element having a threaded portion coacting with a thread on said reciprocating member, a longitudinally slidable element movable in relation to and parallel with the direction of motion of said reciprocating member, a stop to cause the movement of said longitudinally slidable element, a spring to return said element to its normal position, and means whereby the movement of said element rotates said rotatable element independently of said thread to cause said rotatable element to move along said reciprocating member thru the action of said thread.

4. The combination of a primary reciprocating member, a longitudinally slidable element movable in relation to and parallel with the direction of motion of said primary reciprocating member and rotatable in one direction only, means for preventing the rotation of said element in the other direction, a rotatable element, means for allowing the rotation of said rotatable element in one direction and for preventing its rotation in the other direction, a stop to cause the said longitudinal movement of the slidable element, a spring to return said slidable element to its normal position, and means whereby the movement of said slidable element rotates said rotatable element.

5. The combination of a primary reciprocating member, a longitudinally slidable element movable in relation to and parallel with the direction of motion of said primary reciprocating member and rotatable in one direction only, means for preventing the rotation of said element in the other direction, a rotatable element, means for allowing the rotation of said rotatable element in one direction and for preventing its rotation in the other direction, a stop to cause the said longitudinal movement of the slidable element, a spring to return said slidable element to its normal position, to operate said means for preventing the rotation of the longitudinally slidable member in one direction and to operate said means for preventing the rotation of said rotatable element in one direction, and means whereby the movement of said slidable element rotates said rotatable element.

6. The combination of a primary reciprocating member, a second reciprocating member operated therefrom and adjustable in relation thereto, a rotatable element to cause said adjustment, a relatively stationary stop, a longitudinally slidable element engageable with said stop, and means whereby said slidable element is moved in relation to and parallel with the direction of motion of said primary reciprocating member, by its engagement with said stop when said primary reciprocating member exceeds a certain pre-determined amount of travel, to cause the rotation of said rotatable element and the said adjustment between the primary and second reciprocating members.

7. The combination of a primary reciprocating member, a second reciprocating member operated therefrom and adjustable in relation thereto, a longitudinally slidable element movable in relation to and parallel with the direction of motion of said primary reciprocating member and rotatable in one direction only, means for preventing the rotation of said element in the other direction, means whereby, when said slidable element is moved in relation to said primary reciprocating member, said adjustment occurs between said primary and second reciprocating members, and means whereby, when said primary reciprocating member exceeds a certain pre-determined amount of travel, said slidable element is given its said movement in relation to said primary reciprocating member.

8. The combination of a primary reciprocating member, a second reciprocating member operated therefrom and adjustable in relation thereto, a rotatable element to cause said adjustment, means for allowing the rotation of said element in one direction and for preventing its rotation in the other direction, a longitudinally slidable element, means whereby, when said slidable element is moved in relation to and parallel with the direction of motion of said primary reciprocating member, said rotatable element is turned to cause said adjustment, and means whereby, when said primary reciprocating member exceeds a certain predetermined amount of travel, said slidable element is given its said movement in relation to said primary reciprocating member.

9. The combination of a primary reciprocating member, a second reciprocating member operated therefrom and adjustable in relation thereto, a rotatable element to cause said adjustment, means for allowing the rotation of said element in one direction only and for preventing its rotation in the other direction, a longitudinally slidable element, means for allowing the rotation of said slidable element in one direction only and for preventing its rotation in the other direction, means whereby, when said slidable element is moved in relation to and parallel with the direction of motion of said primary reciprocating member, said rotatable element is turned to adjust the relation of said primary reciprocating member and said second reciprocating member, means for giving said slidable member its said movement in relation to said primary reciprocating member, and a spring to return said slidable element to its normal position, to operate said means for preventing the rotation of the rotatable element in one direction and to operate said means for preventing the rotation of said longitudinally slidable member in one direction.

10. The combination of a primary reciprocating member, a second reciprocating member operated therefrom and adjustable in relation thereto, a rotatable element to cause said adjustment, means to restrain the rotation of said rotatable element in one direction only, a longitudinally slidable element having driving connection with said rotatable element thru a spiral key system, means to restrain the rotation of said slidable element in one direction only, means whereby, when said primary reciprocating member exceeds a certain pre-determined amount of travel, said slidable element is moved longitudinally in relation to said primary reciprocating member to rotate said rotatable element thru the action of said spiral key system and a spring to actuate said means to restrain the rotation of said rotatable element in one direction only, to actuate the means to restrain the rotation of said slidable element in one direction only and to return said slidable element to its normal position in relation to the primary reciprocating member.

In witness whereof, I have hereunto set my hand this 16th day of November, 1920.

ALDEN E. OSBORN.